(12) United States Patent
Godec-Schönbacher et al.

(10) Patent No.: US 10,488,434 B2
(45) Date of Patent: Nov. 26, 2019

(54) CHARACTERIZING A HEIGHT PROFILE OF A SAMPLE BY SIDE VIEW IMAGING

(71) Applicant: Anton Paar GmbH, Graz (AT)

(72) Inventors: Martin Godec-Schönbacher, Graz (AT); Alberto Gomez-Casado, Seiersberg-Pirka (AT); Daniel Koller, Graz (AT); Markus Brandner, Raaba-Grambach (AT)

(73) Assignee: Anton Paar GmbH, Graz (AT)

( * ) Notice: Subject to any disclaimer, the term of this patent is extended or adjusted under 35 U.S.C. 154(b) by 0 days.

(21) Appl. No.: 16/047,316

(22) Filed: Jul. 27, 2018

(65) Prior Publication Data
US 2019/0049486 A1 Feb. 14, 2019

(30) Foreign Application Priority Data
Aug. 11, 2017 (EP) ..................... 17185961

(51) Int. Cl.
G01Q 20/02 (2010.01)
G01Q 30/02 (2010.01)
G01Q 10/06 (2010.01)
G01Q 30/04 (2010.01)
G01Q 60/38 (2010.01)

(52) U.S. Cl.
CPC ............ *G01Q 20/02* (2013.01); *G01Q 10/06* (2013.01); *G01Q 30/02* (2013.01); *G01Q 30/025* (2013.01); *G01Q 30/04* (2013.01); *G01Q 60/38* (2013.01)

(58) Field of Classification Search
CPC ........ G01Q 10/06; G01Q 20/02; G01Q 30/02; G01Q 30/025
See application file for complete search history.

(56) References Cited

U.S. PATENT DOCUMENTS

| 5,291,775 | A | 3/1994 | Gamble et al. |
| 5,877,891 | A | 3/1999 | Park et al. |
| 6,489,611 | B1 | 12/2002 | Aumond et al. |
| 7,430,898 | B1 | 10/2008 | Weber-Grabau et al. |
| 8,656,509 | B2 | 2/2014 | Watanabe et al. |
| 8,813,261 | B2 | 8/2014 | Iyoki et al. |
| 9,448,393 | B2 | 9/2016 | Sum et al. |
| 2008/0049223 | A1* | 2/2008 | Iyoki ..................... B82Y 35/00 356/369 |
| 2010/0205699 | A1* | 8/2010 | Tachizaki ............... B82Y 15/00 850/47 |
| 2015/0241468 | A1* | 8/2015 | Sum ................... G01B 9/02091 850/2 |

FOREIGN PATENT DOCUMENTS

| JP | H09329606 A | 12/1997 |
| JP | 2007170862 A | 7/2007 |
| JP | 2015175626 A | 10/2015 |

* cited by examiner

*Primary Examiner* — Eliza W Osenbaugh-Stewart
(74) *Attorney, Agent, or Firm* — Robert A. Blaha; Smith Tempel Blaha LLC

(57) ABSTRACT

A scanning probe microscope, in particular an atomic force microscope, for analyzing a sample by moving a probe and the sample relative to one another, wherein the scanning probe microscope includes a detection unit with a side view camera arranged and configured for detecting an image of the sample in a substantially horizontal side view, and a determining unit for determining information indicative of a profile of at least part of a surface of the sample based on the detected image.

13 Claims, 5 Drawing Sheets

CHARACTERIZING A HEIGHT PROFILE OF A SAMPLE BY SIDE VIEW IMAGING

TECHNICAL FIELD

The present scanning probe microscope (SPM) relates, in general, to an atomic force microscope (AFM) and a method of analyzing a sample with a scanning probe microscope.

BACKGROUND

In an SPM or AFM, prior to scanning the sample surface, usually two engagement steps take place. In a first coarse engagement step, a cantilever-type probe is moved from a few millimeters (or even centimeters) above the sample surface to a position less than 1 millimeter (for instance a few 100 μm) above. After this step, a fine engagement is started, where the cantilever is moved continuously or in steps of a few micrometers until it reaches its final starting position for the measurement.

During such engagement steps as well as during an actual sample analysis where a probe scans the sample, care should be taken that neither the probe nor the sample is damaged by a collision between probe and sample. This problem is particularly pronounced when analyzing samples with complex shape.

U.S. Pat. No. 9,448,393 discloses a scanning probe microscope (SPM) used to investigate or measure large samples whose size is a multiple of the typical operational scanning area of an SPM. To avoid frequent readjustments or other time-consuming human interaction and errors when focusing the SPM, a multi-step, automated method for the SPM-scanning of large samples is disclosed, comprising a coarse, i.e. low resolution, non-SPM scanning or mapping step adapted to scan a large sample and providing an integral map of the sample, followed by a preferably mathematical evaluation step identifying areas of interest of the sample, which areas are then subjected to a focused fine raster scanning step by the SPM with high resolution.

U.S. Pat. No. 7,430,898 discloses a system that includes an optical subsystem and an atomic force microscope probe. The optical subsystem is configured to generate positional information about a location on a surface of the specimen. The system is configured to position the probe proximate the location based on the positional information. A method includes generating positional information about a location on a surface of a specimen with an optical subsystem. The method also includes positioning an atomic force microscopy probe proximate the location based on the positional information. Another system includes an optical subsystem configured to measure overlay of a wafer using scatterometry. The system also includes an atomic force microscope configured to measure a characteristic of a feature on the wafer. An additional method includes measuring overlay of a wafer using scatterometry. The method also includes measuring a characteristic of a feature on the wafer using atomic force microscopy.

However, in particular when a sample has a complex shape, it may still happen that the probe with its highly sensitive tip may unintentionally collide with the sample which may destroy the probe, the sample and/or the analysis. Conventional approaches intending to partially overcome such shortcomings lack precision and are cumbersome.

SUMMARY

There may be a need to enable a simple, quick and failure-free robust operation of a scanning probe microscope.

A scanning probe microscope and a method of analyzing a sample by a scanning probe microscope according to the independent claims are provided.

According to an exemplary embodiment of the invention, a scanning probe microscope (in particular an atomic force microscope) for analyzing a sample by moving a probe and the sample relative to one another is provided, wherein the scanning probe microscope comprises a detection unit which comprises a side view camera arranged and configured for detecting an image of the sample in a substantially horizontal side view, and a determining unit for determining information indicative of a profile of at least part of a surface of the sample (for instance determining one or more quantitative height values of one or more portions of the sample) based on the detected image.

According to another exemplary embodiment of the invention, a method of analyzing a sample by a scanning probe microscope (in particular an atomic force microscope) is provided, wherein the method comprises detecting an image of the sample in a substantially horizontal side view, determining information indicative of a profile of at least part of a surface of the sample based on the detected image, and analyzing the sample by moving a probe and the sample relative to one another taking into account the determined information.

Overview of Embodiments

In the context of the present application, the term "substantially horizontal side view" may particularly denote that the detection unit is configured so that it can detect an image of the sample along an effective viewing direction which does not deviate significantly from a purely horizontal direction, when the sample and the probe are spaced in a vertical direction. This may involve a fully horizontal viewing angle of zero or such a small viewing angle that a substantially true detection of the projection of the sample is possible from this viewing direction. A person skilled in the art will certainly understand that, due to alignment tolerances or the like, there may be a slight deviation from a purely horizontal arrangement or viewing direction.

In the context of the present application, the term "profile of at least part of the sample" may particularly denote information characterizing the topography of an exterior surface of the sample which may be scanned by a probe during an analysis by the scanning probe microscope. Such profile information may comprise information concerning a height profile of the sample or part(s) thereof. For instance, such profile information may be a three dimensional height map indicating for each position of the sample surface (or part thereof) the height of the sample at this respective position. However, such profile information may also be derived from a projection or shadow image from a side view indicating one or multiple regions of the sample having a pronounced height, where care should be taken to avoid a collision during an engagement step and/or an actual analysis. One or more quantitative parameters may be determined as the information from the projection or shadow image, for instance indicating the height of the sample in one more regions relating to a local or global height maximum of the sample.

According to an exemplary embodiment of the invention, a scanning probe microscope is provided in which a profile or height map of a sample to be analysed by the scanning probe microscope is derived at least partially by a side view camera. Determining the sample profile information by a side view camera provides meaningful information concerning one or more local maximum sample height regions which can be properly detected from a side view, i.e. as a vertical projection or as a shadow image. Such regions of local maximum height of the sample can be captured properly from a side view and provide highly relevant information for properly navigating a probe tip away from such sample regions of maximum height. At the same time, the detection of the sample by a side view camera in terms of height map determination keeps the region above the sample free so that the operation of the scanning probe microscope is not disturbed.

Prior to scanning a sample surface in terms of the actual analysis of the sample, the probe should be situated at a small distance above the sample. For this purpose, particularly for samples that are large in a horizontal dimension and have significant height and/or thickness variations, it is desirable to generate a height map (in particular a three dimensional profile) of the sample surface. Otherwise the operator would have to move the probe very carefully into the x- and y-directions (i.e. within a horizontal plane) in order to avoid crashes and damages of sample and/or probe. According to an exemplary embodiment, it is possible to provide a (for instance three dimensional) profile, which may also be denoted as height map, of the sample by side view imaging in order to give to the operator (or to the instrument in case of a fully-automatized embodiment) information which assists probe navigation in the x- and y-directions and probe-to-sample approach in the z-direction (which may be a vertical direction). The existence of such a map accelerates navigation and avoids collisions between the probe and zones of the sample that highly extend in z-direction. This applies in particular to large samples which extend in the lateral (x and y) dimensions and/or samples which are not flat.

More specifically, exemplary embodiments of the invention may provide a real side view sensor, i.e. a detection unit in the form of an observation system (which may comprise a camera, a sensor, etc.) that is able to capture a horizontal view of the scene, i.e. the area of interest in form of the three dimensionally curved surface of the sample or more precisely a projection thereof. "Horizontal" may denote in this context that the optical detection path is parallel or at least substantially parallel to the x-y-plane of the measurement system (the z-direction being the direction of vertical movement of probe and/or sample stage). Horizontal hence also includes directions or planes that are slightly slanted or tilted. The deviation from the horizontal plane should be preferably less than 5°, in particular less than 2° or even less than 1°, particularly preferably less than 0.5°. It should be considered that a horizontal view not necessarily requires that the observation device or detection unit (for instance one or more cameras) itself is placed in the respective horizontal plane, since also folded optical paths may be implemented.

In the following, further exemplary embodiments of the scanning probe microscope and the method will be explained.

In an embodiment, the determining unit is configured for determining information of at least one of the group consisting of determining one or multiple height values from a shadow image of the sample, and determining a three dimensional surface function of at least part of the sample. With one side view camera being arranged at a fixed position, a vertical projection or shadow image can be obtained. In such an embodiment, there is only the horizontal camera which only yields a kind of shadow image of the profile. In other words, the side view sensor on its own may yield a two dimensional shadow image. Providing two or more side view cameras and/or rotating the side view camera(s) with respect to the sample stage will give more information in terms of a sample profile. Thus, the provision of two or more side view sensors and/or rotating the sensor and/or the sample enable the detection of even finer structures (such as valleys that are hidden behind mountains). By adding to the side view camera at least one further camera (in particular a further camera providing top-down view or oblique view information), a three dimensional map of the sample surface or part thereof may be determined.

In an embodiment, the determining unit is configured for determining information indicative of the profile by combining, in particular by correlating, multiple images of the sample detected by the detection unit from different positions and/or orientations. For instance, information gained by a side view system can be combined with other information gained by other detection and/or observation systems providing different views of the sample from non-horizontal perspectives, for example from a top-down perspective and/or from an oblique perspective. In such a manner, further information of the sample can be generated, such as height maps or three dimensional representations of the sample.

In an embodiment, the detection unit is configured for detecting the multiple images of the sample by multiple cameras arranged at different spatial positions and/or in different spatial orientation. This allows extending or broadening the basis of information from which the sample profile information can be derived.

In an embodiment, the detection unit is configured for detecting the multiple images of the sample by configuring at least one camera and the sample for being moved relative to one another to different positions and/or different spatial orientations. For instance, one side view camera may be moved to a first position relative to the sample for capturing a first image. Subsequently, this side view camera may be rotated for instance around a vertical or z-axis by for example 90° with regard to the sample to capture a second image there. The combination of these two (or more) images allows refining the information concerning the sample profile.

In an embodiment, the determining unit is configured for determining the information by analyzing a detected image of the sample on which a predefined light pattern is projected. The determining unit may evaluate a deviation between a shape of the detected structured light (for instance a curved line) on the profiled sample surface and the predefined light pattern (for instance a straight line) which has been initially projected onto the sample surface. This deviation is due to the surface profile of the sample, which can therefore by characterized. Thus, structured light (for instance one or more straight lines of light) may be used for getting additional information for deriving a full three dimensional image of the surface profile of the sample. In this context, it is possible that a predefined pattern is projected on a surface of the sample. Irregularities of the surface change the light pattern. A camera with image recognition capability may detect a corresponding light image. The image may be processed for detecting changes of the light pattern which may allow calculating the actual contour of the surface of the sample.

In an embodiment, the determining unit is configured for determining the information by analyzing a detected image of the sample by carrying out at least one of pattern recognition and object recognition. What concerns object recognition, the camera recognizes different objects, for instance may distinguish between sample and sample holder. This helps to identify zones that are hidden behind elevated structures and otherwise cannot be detected. What concerns pattern recognition, one or more predetermined patterns may be detected on a respective image, thereby refining the basis of information concerning the sample surface, in particular a border between the sample and a sample holder.

In an embodiment, the determining unit is configured for determining the information by analyzing multiple detected images of the sample in terms of three-dimensional reconstruction. In particular the combination of different images detected from different spatial directions or orientations may provide complementary information allowing characterizing the sample surface in a highly accurate way.

In an embodiment, the scanning probe microscope may comprise at least one HDR (High Dynamic Range) camera, which may for instance form a side view camera, a wide view camera or a microscope. HDR imaging facilitates the measurement of reflecting surfaces and compensates inhomogeneous illumination. Thereby, reliable information concerning sample surface profile may also be determined under harsh conditions or in the presence of difficult illumination conditions.

In an embodiment, the scanning probe microscope comprises a processing unit (such as one or more processors or part of a processor, for instance a microprocessor or a central processing unit, CPU) configured for processing the determined information for instance in one or more of the following ways.

In one embodiment, the processing unit may process data and/or information for determining at least one non-reachable region being not reachable by the probe in view of the profile of the sample. For this purpose, the processing unit may take into consideration geometry information indicative of a geometry of the probe and/or of structures supporting the probe, and the profile information concerning the sample. By taking this measure, the processing unit may calculate one or more regions of the sample which cannot be analysed by the probe without a risk of collision between the probe and/or structures supporting the probe on the one hand and the sample on the other hand as a result of the geometrical conditions.

In one embodiment, the processing unit may process data and/or information for determining control information for controlling the probe to move to an initial profile-related position for analyzing a sample. The decision concerning the initial position for starting the analysis may be governed by the goal to determine a shortest or fastest trajectory along which the probe is to be moved relative to the sample to reach an appropriate starting position taking into account the surface profile of the sample, i.e. avoiding collisions.

In one embodiment, the processing unit may process data and/or information for determining control information for controlling the probe and the sample to move relative to one another along a profile-adapted trajectory during a process of analyzing the sample. A trajectory indicative of a relative motion between the probe and sample during analysis of the sample may be determined by omitting forbidden or non-reachable regions at which sample and probe might collide due to the geometry of the probe and the sample's surface profile.

In an embodiment, the side view camera is arranged and configured for (preferably simultaneously with capturing image data indicative of the surface profile of the sample) monitoring a gap between the sample and the probe in a substantially horizontal side view. Correspondingly, the determining unit may be configured for determining information characterizing the gap, in particular determining a size (for instance a vertical extension) of the gap, based on image data detected by the detection unit in terms of monitoring the gap. According to such an exemplary embodiment of the invention, a scanning probe microscope is provided in which a gap between a probe and a sample can be truly detected in a reliable way so that at least a coarse adjustment of the probe and the sample relative to one another can be established in a short time. This can be accomplished without any risk of damages of probe and/or sample by an unintentional collision of the probe and the sample, in particular due to an excessive approach between these two bodies as a result of an erroneously or inaccurately determined gap. By taking an image of the gap in a precise or approximate horizontal view rather than from a large oblique viewing angle, the true dimension of the gap between probe and sample can be easily, quickly and reliably determined. This determined information, which may also be detected repeatedly, may be used for controlling the procedure of approaching sample and probe.

In an embodiment, the image in the substantially horizontal side view is detected at an angle of less than 5°, in particular of less than 2°, to a horizontal axis. It has turned out that with very small angular discrepancies from a purely horizontal side view, it is still possible to obtain meaningful and reliable information with regard to the height profile of the sample, and also of a dimension of the gap between sample and probe. By allowing relatively small deviations from a pure horizontal arrangement of the detection unit, a scanning probe microscope is provided which is tolerant against small inaccuracies. It has turned out that in particular with deviations of less than about 5°, quick alignment of the system is possible without excessively compromising on sample surface profile characterization as well as precision of gap detection and failure-free coarse adjustment.

In an embodiment, the scanning probe microscope comprises an optical system, in particular at least partially between the sample and the detection unit. Such an optical system may comprise one or more optical elements, such as lenses, mirrors, apertures, beam splitters, etc. Such an optical system may manipulate the radiation beam before it reaches the detection unit (such as a CMOS detector or a CCD detector or an array of photodiodes).

In an embodiment, the optical system is a telecentric optical system, in particular a telecentric optical system providing a magnification independent of a distance between a (in particular presently analyzed) measurement point of interest of the sample and the side view camera. The side view camera (in particular in combination with at least one further camera such as a wide view camera and/or a microscope) may be adjusted for capturing image information concerning a respective measurement point of interest at the sample surface. Thereafter, the side view camera (in particular in combination with the at least one further camera) may capture image information concerning another measurement point of interest of the sample, to thereby obtain information indicative of a height distribution of the sample by combining the individually derived items of information. When a telecentric optical system is implemented, the magnification in the images is the same for different measurement points of interest of the sample. This renders the individual items of information better comparable and combinable.

In an embodiment, the optical system is a telecentric optical system, in particular a telecentric optical system providing a magnification substantially independent (in particular with a deviation of not more than 10%) of a distance between a gap between the sample and the probe on the one hand and the side view camera on the other hand. When a telecentric optical system is implemented, the telecentric system may be positioned far away from the sample. This significantly simplifies implementation of a true side view, because size constraints of the apparatus which, in many geometrical embodiments, would not allow positioning of the optical system very close to the sample and the probe. However, when a telecentric optical system is used, the distance between the optical system and the arrangement of sample and probe may be large without reducing the resolution of the height profile of the sample or a size of the gap on an image captured by the telecentric optical system. It is a characteristic of a telecentric optical system that the resolution of the height profile of the sample and the gap size, as it appears on an image captured by the detection unit, is substantially independent from the distance between the image detecting surface of the detection unit and the position of sample and probe. With such a highly preferred embodiment implementing a telecentric optical system, it is possible to obtain a sample profile determination (and optionally additionally a gap detection) architecture which is very robust against misalignment and the like and provides high tolerances. A telecentric optical system has the property that it projects the image of the sample surface (and optionally of the gap) onto a light sensitive detector of the detection unit in such a way that the resolution of the height profile of the sample surface (and optionally a size of the gap) does not depend on the mentioned distance conditions. Providing a telecentric optical system also renders it dispensable to frequently readjust the optical system or the elements of the scanning probe microscope as a whole.

A telecentric lens, which may be implemented in a telecentric optical system according to an exemplary embodiment, is a compound lens that has its entrance or exit pupil at infinity. In the prior case, this produces an orthographic view of the projection of the sample surface and the gap. This means that the optical system selects the principal rays, i.e. the rays which are parallel to the optical axis in front of or behind the system, respectively. A simple way to make a lens telecentric is to put the aperture stop at one of the lens's focal points. An entrance pupil at infinity makes the lens object-space telecentric, so that image magnification is independent of a distance of the sample-probe arrangement or a gap's distance or position in the field of view of the detection unit.

In an embodiment, the scanning probe microscope comprises an illumination unit configured for, in particular homogeneously, illuminating a side projection of the sample and/or a gap between the sample and the probe with electromagnetic radiation, in particular from a substantially horizontal side position. As the detection unit, also the illumination unit may or may not be horizontally aligned, as long as the electromagnetic radiation beam generated by the illumination unit propagates along or around the sample and/or the gap in a substantially horizontal propagation direction. This may or may not involve a folded beam path, in particular between the illumination unit on the one hand and gap or sample on the other hand. Such an illumination unit may emit electromagnetic radiation (in particular visible light, alternatively ultraviolet radiation or infrared radiation) so as to illuminate the gap and thereby improve the contrast between gap on the one hand and probe and sample on the other hand on the detected image(s). Also, a homogeneous illumination of the sample from a lateral position may be advantageously achieved. By taking this measure, the accuracy of characterizing the height profile of the sample (and optionally identifying the gap on the image) can be improved, and thereby the accuracy of the adjustment of the probe-sample interaction can be improved. When the illumination unit is also arranged in a substantially horizontal side position (as described above for the detection unit), the electromagnetic radiation beam may propagate substantially along a straight direction between illumination unit and detection unit. This additionally contributes to a high accuracy of the detection. It should however be said that, in another embodiment, in which sufficient light from the surrounding environment is present, it is also possible to omit the illumination unit.

In the context of the present application, the term "homogeneously illuminating" may particularly denote that the intensity of the electromagnetic radiation beam is substantially or entirely the same over the entire extension of the gap, for instance deviated over the gap extension by less than 10%. By taking this measure, any optical artefacts resulting from an inhomogeneous illumination of the gap, and which may lead to an erroneous determination of the sample profile and/or the gap and its size from the image, may be prevented. In an empty scene (in which no sample or cantilever-type probe is visible), any deviation from homogeneity will be perceived by the sensor or detection unit as different levels of intensity (in particular over the gap extension). The contrast of this empty image sets a limit for the optical density of objects recognizable on the scene. That is, if for example a transparent or semi-transparent sample is placed in the apparatus, the contrast of the resulting image should be significantly higher than the illumination inhomogeneity, to ensure that the detection of the sample boundaries by either a human operator or a computer algorithm has a high reliability and accuracy.

There are various possibilities as to how a homogeneous illumination can be accomplished according to different embodiments. In one embodiment, an optical element accomplishing this is a prism with grinded faces placed in the propagation path of the electromagnetic radiation. In another embodiment, homogeneous illumination can be accomplished by a diffuser, which may be embodied as a stack of diffusive surfaces. A diffuser may be realized in transmission geometry (so that the light beam propagates through the diffuser and is thereby rendered homogeneous or more homogeneous) or in reflection geometry (so that the light beam is reflected at the diffuser and is thereby rendered homogeneous). In yet another exemplary embodiment, homogeneous illumination may be obtained by implementing a bundle of fibers, acting as light guides. In each of the mentioned embodiments, a light-emitting diode may be used for example as electromagnetic radiation source.

In an embodiment, the detection unit comprises, in addition to the above mentioned at least one side view camera, a wide view camera arranged and configured for detecting a wide angle image of at least part of the (in particular of the entire) sample, in particular from a top position or an oblique position. For instance, a wide view camera may view an area of the sample of at least 1 cm². For example, such a wide view camera may capture an area of the sample of 4 cm×4 cm. A viewing direction of the wide view camera may assume an angle with a viewing direction of the side view camera of for example at least 30°, in particular at least 60°, more particularly at least 80°. By such a wide view camera, slanted or plan view information concerning the sample may be captured, i.e. in particular information concerning the sample profile in a horizontal plane. Thus, a significant further refinement may be achieved by using the above mentioned side view camera in combination with the described wide view camera. Such a wide view camera may provide a wide angle view of the sample or a portion thereof from a top or an obliquely upward position. The synergistic combination of the above described side view sensor with the additional wide view sensor may yield a (relatively low-resolution) x-y-position and a corresponding z-position of the respective point (i.e. the height of the sample at this x-y-point).

In an embodiment, the detection unit comprises, in addition to the above mentioned at least one side view camera (and optionally in addition to the above mentioned at least one wide view camera), at least one microscope (which may also be denoted as a narrow view camera) arranged and configured for detecting only a subportion of the sample, in particular from a top position or an oblique position. For instance, a microscope or narrow view camera may view an area of the sample of not more than 10 mm$^2$. For example, such a microscope may capture an area of the sample of 2 mm×2 mm. A viewing direction of the microscope may assume an angle with a viewing direction of the side view camera of for example at least 30°, in particular at least 60°, more particularly at least 80°. Preferably, a viewing direction of the microscope assumes an angle of 90° with a viewing direction of the side view camera. By such a microscope, highly resolved but spatially limited plan view information concerning only a subportion of the sample may be captured, i.e. information concerning the microscopic sample profile in a horizontal plane. In an embodiment, the microscope may view a smaller area of the sample than the wide view camera and/or may have a higher resolution than the wide view camera. It may be in particular preferred that a third sensor in the form of the microscope (being preferably arranged in a top-down-view position), may be implemented in addition to a side view camera and a wide view camera. The combination of side view camera, wide view camera, and microscope may provide three dimensional profile information of the sample at a very high resolution.

In an embodiment, the determining unit is configured for reconstructing the profile of the sample by combining at least one image captured by the side view camera and corresponding to a projection of the sample on a vertical plane (as seen by the side view camera in a substantial horizontal side view) with at least one further image captured by at least one further camera and corresponding to a projection of the sample on another plane (i.e. a plane being angled with regard to the vertical plane, for instance a horizontal plane). The latter projection can be seen in a top-down view or an oblique or slanted view. In other words, surface profile information detected by the side view camera may be interpreted in terms of complementary surface profile information detected by the at least one further camera (such as a wide view camera and/or a microscope). By taking this measure, a complete picture of the height profile of the sample can be obtained by a synergistic combination of the mentioned information elements.

In an embodiment, analyzing the sample in terms of scanning probe microscopy is carried out based on the determined information. Thus, the actual analysis of the sample by the scanning probe microscope may use the information concerning the height profile of the sample to prevent damage and to highly accurately characterize the sample under analysis.

In an embodiment, the scanning probe microscope comprises a drive unit configured for moving the probe and/or the sample for mutually approaching probe and sample from an initial distance of for instance at least 3 mm (in particular of at least 5 mm) to a final distance of for instance less than 1 mm based on the detected image of the gap. Therefore, the drive unit may be capable of establishing an (in particular a coarse) adjustment of a desired distance between probe and sample in a quick and reliable way. Controlling an approach of these two elements up to an already small distance under consideration of the determined gap size derivable from the detected image, there is no risk of an undesired collision between probe and sample. In view of the horizontally detected gap size, it can be determined very precisely, and the (for instance coarse) adjustment can be made very accurately and reliably as well. Therefore, the beginning of the actual scanning probe microscope investigation can be performed very quickly.

In an embodiment, the drive unit is configured for moving the probe and/or the sample for mutually approaching the probe and sample relative to one another from the initial distance to an intermediate distance with a first velocity and subsequently from the intermediate distance to the final distance with a second velocity smaller than the first velocity. This slower approaching motion may be controlled by measuring the probe (in particular cantilever) deflection, i.e. by detecting the atomic or molecular forces between probe tip and sample surface and calculating the distance. Additionally or alternatively, also the motion with the second velocity may be based on or determined from the detected image of the gap.

In an embodiment, the portion of the drive unit accomplishing the approaching from the initial distance to the intermediate distance may be embodied as one driving stage (for instance a motorized driving stage). The portion of the drive unit accomplishing the approaching from the intermediate distance to the final distance may be embodied as a combination of two driving stages, for instance the driving stage used for the approaching from the initial distance to the intermediate distance in combination with an additional stage (for instance a piezo stage). According to this embodiment, the above described coarse adjustment may be followed by a fine adjustment which shall be conducted with a lower velocity so as to prevent undesired collision of probe and sample as a consequence of unavoidable remaining inaccuracies. Dividing the approaching procedure into a first portion in which probe and sample may be approached quickly may be followed by a second procedure in which the approaching is continued with a smaller velocity. Due to the improved accuracy of the determination of the gap size in view of the substantially horizontal side view of the detection unit, the first velocity may be increased or the beginning of the second fine adjustment can be postponed. This speeds up the entire procedure of preparing the scanning probe microscope before starting an experiment.

In an embodiment, the drive unit is configured for being operable manually by an operator or automatically under control of a control unit. When the detected image is displayed to a human operator, the human operator is enabled to reliably adjust the distance between probe and sample before starting the actual experiment. While continuing to detect images of the gap during this approaching procedure, an operator may retrace the progress of the approaching procedure and may therefore adjust the distance between the probe and sample reliably. Alternatively, it is also possible that the determined gap size, which can also be detected automatically by image processing (such as image recognition) or the like, is taken as a basis for a machine controlled adjustment of a starting position between probe and sample before beginning with a scanning probe microscope analysis. Both approaches can be conducted with high reliability in view of the image of the gap detected from a true side view.

In an embodiment, the detection unit is configured for being capable of detecting a size or dimension of the gap (i.e. a distance between probe and sample) for samples of different sizes, without readjustment of the optical system. In such an embodiment, the detection unit is configured so as to be capable of detecting images and gap sizes over a broad range. For example, the scanning probe microscope may be configured to operate with samples having a thickness (or height) of up to 30 mm. This allows to mount the optical system of the detection unit once and maintain its alignment without frequent modifications even when the size and/or shape of the sample or a starting distance between probe and sample changes. Rendering a readjustment of this optical system dispensable allows a user to operate the scanning probe microscope without being prone to failure or inaccuracies. In particular a highly preferred implementation of a telecentric optical system facilitates measurements with such samples.

In an embodiment, an optical path between the illumination unit and the detection unit is an unfolded linear optical path (see FIG. 4 for a part of such a path). Such a configuration can be implemented with very low hardware effort and is not prone to optical artefacts.

In another embodiment, an optical path between the illumination unit and the detection unit is a folded optical path, in particular comprising one folding position (see FIG. 2) or two folding positions (see FIG. 1). Such an embodiment is advantageous in particular when there are constraints in terms of apparatus components making a linear part impossible or inappropriate. In such a scenario, any free spatial regions (not occupied by components of the scanning probe microscope) can be used for accommodating the illumination unit and/or the detection unit. One folding position may fold the optical path between the illumination unit and the gap between probe and sample. Additionally or alternatively, another folding position may fold the optical path between the gap between probe and sample on the one hand and the detection unit on the other hand.

In an embodiment, the detecting unit and the illumination unit are arranged on opposing sides of the sample and the probe so that the electromagnetic radiation propagates from the illumination unit via the gap to the detection unit. It should be said that the illumination unit and the detection unit can either be arranged along the propagation direction of the electromagnetic radiation while propagating through the gap. However, alternatively, it is possible to implement one or more deflection mirrors or other optical elements (e.g. lens, plate, wedge and/or prism) which modify the propagation direction of the electromagnetic radiation so that the actual arrangement of the detection unit and/or of the illumination unit can deviate from the propagation direction of the electromagnetic radiation beam during passing the gap. While the former embodiment allows for a very short optical path which is neither prone to failure nor unduly limits the intensity of the electromagnetic radiation beam from its way from the illumination unit to the detection unit, the latter embodiment provides a higher degree of freedom where to arrange the detection unit and/or the illumination unit.

In an embodiment, the optical system comprises at least one lens. When the optical system comprises only one lens, the loss of intensity of the electromagnetic radiation beam upon propagating through the optical system can be kept very small. Therefore, a high quality of the detected image of the gap may be obtained so that the determination of its size, shape, etc. can be rendered very precise. However, when implementing two lenses, optical artefacts may be strongly suppressed and a highly true image of the gap may be projected onto the detection unit.

In a preferred embodiment, at least one lens is located at a distance from the detection unit which corresponds at least substantially to a focal length of this lens. By taking this measure, a size of the gap on a detected image is truly independent of the distance between the gap and the detection unit.

In an embodiment, the scanning probe microscope comprises a determining unit configured for determining a quantitative value of the distance between the sample and the probe based on the detected image. Determining such a quantitative distance between probe and sample allows the adjustment of the mutual spatial relationship between probe and sample very quickly. Such a determination may be carried out by image processing or manually by an operator by displaying also a scale on a display of the detected image of the gap. By determining the distance, a simple and automatically processable parameter may be determined which may be of high value for the adjustment procedure.

In an embodiment, the scanning probe microscope may comprise at least two detection units arranged around an array composed of the probe and the sample, each detecting unit being arranged for detecting a substantially horizontal side view of the sample surface and optionally also of the gap from another direction. Thus, at least two detection units may be arranged around the sample-probe array, each detecting a substantially horizontal side view from another direction. This renders a positional adjustment between probe and sample very convenient and precise.

In an embodiment, the scanning probe microscope comprises an optical manipulation unit configured for manipulating electromagnetic radiation propagating (for instance from the sample and/or from the gap) towards the detection unit, in particular a grinded prism for generating a set of parallel rays of electromagnetic radiation with homogeneous intensity. By generating a set of parallel light beams, the illumination and detection procedure may be rendered highly accurate. Optical artefacts may be strongly suppressed.

In an embodiment, the scanning probe microscope is configured as atomic force microscope. However, other types of scanning probe microscopes may be equipped with the detection unit for detecting the gap between probe and sample as well. An example for such an alternative scanning probe microscope, which may be implemented according to an exemplary embodiment of the invention, is a scanning tunneling microscope, in which a stimulating current is applied to a tip so that, due to a tunnel effect, a measured response current depends on an actual force present between tip and sample.

Other examples for a scanning probe microscope, which may be implemented according to exemplary embodiments of the invention, are a scanning near-field optical microscope (SNOM), a tip-enhanced Raman spectroscopy (TERS) microscope, or a magnetic force microscope (MFM).

BRIEF DESCRIPTION OF THE DRAWINGS

Embodiments of the dispenser can be better understood with reference to the following drawings. The components in the drawings are not necessarily to scale, emphasis instead being placed upon clearly illustrating the structures and principles of operation of the assemblies.

OVERVIEW OF EMBODIMENTS

Figure 1:
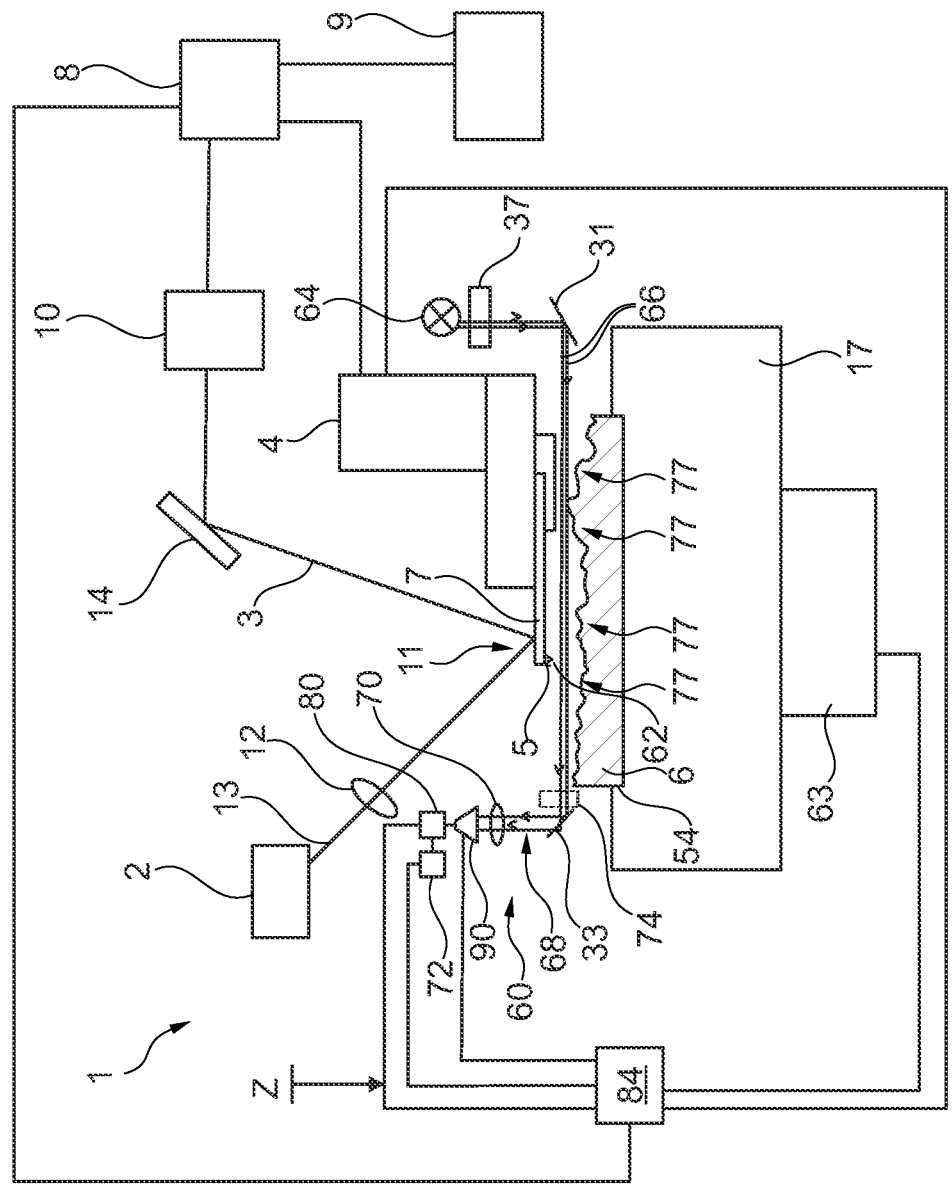
FIG. 1 shows a scanning probe microscope according to an exemplary embodiment of the invention providing a height map of a sample to be analyzed.

The aspects defined above and further aspects of the invention are apparent from the examples of embodiment to be described hereinafter and are explained with reference to these examples of embodiment.

The illustrations in the drawings are schematically presented. In different drawings, similar or identical elements are provided with the same reference signs.

Before referring to the drawings, some basic considerations will be summarized based on which exemplary embodiments of the invention have been developed.

According to an exemplary of the invention, a side view camera based sample profile determination architecture is provided. In particular, a multiple camera based sample height map determination may be carried out, in particular for assisting probe control, more particularly cantilever engagement.

In scanning probe microscope systems, it is desired to situate the probe and the sample in close vicinity prior to the final engagement procedure. This engagement is typically a slow process, which duration scales linearly with a gap that needs to be covered. Thus, reducing or even minimizing this initial gap is desirable to improve throughput of the instrument. While moving the probe (for instance a cantilever) towards the sample or vice versa, caution should be taken since accidental contact of the cantilever probe with the sample can damage the probe tip and/or the sample and/or the instrument.

If the samples, that the instrument admits, are also large in the horizontal dimension, and have significant height changes, the operator should also take care to not crash against protruding or high features when translating one of sample and probe laterally.

When no sample height map is available, the user must either: monitor in-situ the coarse approach by eye or monitor the approach and navigation by comparing a top-down view focus of the sample and probe. Such monitoring of the coarse approach requires a good view of the sample/measuring head, which usually involves opening any enclosure around the system. The system may be destabilized (temperature) by this operation. Furthermore, such an approach does not reliably prevent highly undesired collisions between the sample and the probe. Monitoring the approach and navigation by comparing a top-down view focus of sample and probe can lead to crashes when the top surface is not easy to focus, for example if the material is transparent or very polished and the surface is clean of contamination. These types of surfaces (very clean, optically flat) are common in scanning probe microscope and tribology studies. This may also be problematic when the sample has a degree of tilt that makes some areas of the sample exceed the depth of field of the microscope optics so not all the field of view can be focused at once.

Thus, there remains conventionally a risk of crashing with parts of measurement sensor/head during movements from one position on the sample to another position.

Furthermore, in microscopy operations, navigation over large samples is usually tedious because the target measurement location is tiny in comparison to the navigation space. In addition, microscopes usually have a very limited Depth of Field (DoF), which makes keeping the sample in focus during movement over larger distances very difficult. The limited DoF also increases the time needed to focus onto the sample surface.

In view of the foregoing and to overcome the mentioned and other shortcomings, an exemplary embodiment of the invention provides a side view camera for capturing one or more images used for deriving sample surface profile information. This makes it possible to obtain an accurate height estimate of the sample underneath the scanning probe microscope, which can significantly improve the navigation performance and the user experience thereof.

According to an embodiment of the invention, an optical side view sensor is provided that is capable of imaging a projection of the surface profile of the sample and preferably at the same time the gap between sample and measurement probe. The detected image may be processed for determining height profile information of the sample. This sensor may also work for transparent or reflective samples which are usually an issue for image-based methods, since the side view camera images predominantly one or more maximum height regions over one axis or multiple axes. To accomplish fast and safe navigation over larger areas, it is preferable to get an even better overview over the whole sample area, which may be much larger than the field of view (FoV) of the side view sensor. It may then be possible to get quantitative values for the actual sample height, in particular a height profile, out of the sensor's image. To further broaden the basis of image information, the side view camera may therefore be combined with at least one further sensor or camera, such as a wide view camera and/or a narrow view camera or microscope.

According to a preferred embodiment of the invention, two, three or even more cameras may be implemented. In particular, it may be possible to involve multiple cameras having different imaging properties in different spatial orientations. In an embodiment, these cameras may be referenced (for instance calibrated and/or adjusted) via one target (such as a navigation coordinate system).

In an embodiment of the invention, a safe engagement may be achieved. For instance, this can be accomplished by sample rotation. Additionally or alternatively, this can be realized by capturing both micro and macro images. It is also possible to take into consideration geometric data (such as CAD data) of components of the scanning probe microscope to prevent collision with the sample.

Exemplary embodiments of the invention may also have advantages in terms of automation. In one embodiment, user interaction will be only needed for scan region selection, but there is no need for an involvement for engagement.

It may be also possible with exemplary embodiments to speed up navigation between samples of different height and engagement.

Embodiments based on a safe coarse engagement application may use a camera for viewing the profile of a sample. It may also be possible to use a calibrated side view sensor for capturing a shadow image of the whole sample by moving the sample or the camera relative to each other.

In another embodiment, the height profile determination architecture may be further facilitated by adding a wide field camera (which may also be denoted as wide view camera) to the side view camera for getting a further refined sample overview. In such an embodiment, it is for instance possible to move the sample and the camera relative to one another (the sample area may be larger than a field of view). This allows obtaining a refinement of the height map based on a three dimensional reconstruction methodology like structured light, stereo view and/or based on object recognition.

A combination of a side view camera and a wide view camera for sample profile determination is also an automatic safe approach without user interaction during the measurement. Such a combination has the further advantage of a fast navigation between samples of different height and an automated approach with any measurement unit. The mentioned combination may be further facilitated with another high magnification camera (also denoted as narrow view camera or microscope) calibrated onto the atomic force microscope for micro navigation and region of interest selection.

The combination of a side view camera (in particular with telecentric optics), a wide view camera and a narrow view sensor (such as a microscope) allows obtaining a safe, fast and automatic atomic force microscope cantilever engagement without user interaction.

In an embodiment, it is possible to carry out a sample and/or side view camera rotation which allows obtaining a full three dimensional height function of the sample surface (in different embodiments with or without additional cameras).

It is also possible to implement structured light which is projected on the sample surface for obtaining a full three dimensional image. For a further refinement of the derived height profile, a recognition process to discriminate between sample and non-sample regions may be implemented. It is also possible to use a light source (for example a laser spot) or feature that is visible in both macro and micro view for calibration and/or adjustment of the camera coordinate systems. For height landscape determination, it may be sufficient to use only the side view camera and a moving sample. However, an overview camera may be provided to support large scale sample navigation. A micro camera support region selection may be made for an atomic force microscope measurement. It is also possible that side view sensor information is overlaid, for example establishing a contour plot. Preferably, an implemented macro/micro camera can be a High Dynamic Range (HDR) camera, to improve imaging capabilities for samples with difficult properties, such as high reflectivity.

According to an exemplary embodiment of the invention, the already mentioned side view camera used for height profile characterization of the sample may be optionally additionally used for assisting a fast coarse approach between sample and probe of the scanning probe microscope. Such an embodiment may additionally provide a reliable view of the sample-probe separation to aid in the coarse approach operation. A preferred embodiment of the invention provides a telecentric view of the scene between sample and probe. This view offers good contrast even when the sample includes transparent layers and enables accurate measurement of the distance between sample and cantilever. Embodiments of the invention provide a large field of view compared to conventional systems, allowing larger samples to be examined in the system. A view obtainable by embodiments of the invention is properly compatible with automated processing and automated or remote guidance of the instrument. The use of a true side view (i.e. exactly or approximately 90° from a top-down axis instead of an oblique view) in a scanning probe microscope instrument enables an operator to monitor a distance between probe and sample. Optical components of the system may or may not be placed in the side view axis, as long as the view is captured that is seen along that axis. An appropriate true side view optical system or arrangement is telecentric so the distance can be judged accurately for multiple sample-probe positions with respect to the optical axis of the side view system.

In an embodiment, the output of the side view system can be used as input for the operator and/or also for automated procedures (for instance a coarse approach to the sample, a crash avoidance mechanism, etc.). In another embodiment, the output of the side view system can be used for remote operation of the instrument, avoiding destabilization of conditions such as temperature, pressure and/or humidity (due to opening sample chambers) and additional waiting times. It is also possible that the output of the side view can be calibrated to provide quantitative information about the distance between probe and sample and also about the sample geometry. It is also possible that two side view systems looking at orthogonal directions can be combined to increase safety and speed of sample navigation.

A side view system of an embodiment of the invention may implement a source (for instance LED arrays, diffusors, light guides) of homogenous illumination covering an expected range of sample heights. In an embodiment, a side view telecentric optical system or arrangement may be combined with a grinded glass prism to generate a set of parallel rays with homogeneous intensity over the whole field of view. A preferred embodiment of the invention uses an object-space telecentric optical system which may provide a magnification independent of the object's distance from the sensor/lens and the position of the object in the field of view of the system.

Components of a telecentric optical system may be a pinhole, one or more lenses, an optical member ensuring parallel rays, an electromagnetic radiation source generating a homogeneous illumination, and a light and camera arrangement as detection unit. In a preferred embodiment, the propagation path of an electromagnetic radiation beam is from a light source, through or to a diffusor, onto a part of the sample surface and to the gap between probe and sample, and from there to a sensor, so that the light passes through the sample-cantilever gap and reaches the sensor. In this arrangement, the contrast between the solid parts and the gap between them is very high.

Other embodiments of the invention may have the light source and the sensor situated at the same side of the sample, or at an angle. In such as arrangement, the light that the sensor receives may bounce from the sample. This may provide even more details about the sample.

Other exemplary embodiments may implement two or multiple light sources. A first light source may be situated so that the light passes through the sample-cantilever gap and reaches the sensor. The second light source may be situated at the same side of the sample, or at an angle. In such an arrangement, the light that the sensor receives can bounce from the sample. Also such an embodiment may provide more details about the sample.

Having a high contrast between the solid parts and air helps the operator to decide where the solid parts end. Furthermore, if the scene acquired by the side view sensor is used as an input for machine vision and/or automatic control of the instrument, the threshold used to automatically detect which regions of the image correspond to a sample or cantilever is directly related to the contrast of the image.

In a preferred embodiment, the light source is homogeneous over an area covering the full scene seen by the sensor or detection unit. In an empty scene (i.e. no sample or cantilever visible), any deviation from homogeneity may be perceived by the sensor as different levels of intensity. The contrast of this empty image sets a limit for the optical density of objects recognizable on the scene.

In an embodiment, a method to monitor the gap between cantilever and sample is provided. Moreover, a method to move the relative distance between tip and sample from a distance larger than 5 mm (or even larger than 10 mm or 20 mm) to a distance smaller than 1 mm (or even smaller than 0.5 mm or 0.1 mm) is provided. In another embodiment, a method to quickly approach the cantilever to a sample or the sample to a cantilever from a distance so large that fine engagement is unpractical to a distance where the fine engagement takes one minute or less is provided. Furthermore, an apparatus is provided in which a setup is fixed with respect to a sample with a large vertical field of view that eliminates the need to adjust or reconfigure the configuration to variant sample heights. It is also possible to carry out a lens distortion correction, scene stitching, etc.

DETAILED DESCRIPTION OF ILLUSTRATED EMBODIMENTS

FIG. 1 shows a scanning probe microscope (SPM) 1 according to an exemplary embodiment of the invention being embodied as atomic force microscope (AFM).

In the scanning probe microscope 1, an elongation of a probe 11, i.e. a change of position or shape of the probe 11 (which can be embodied as a cantilever 7 with a protruding tip 5) when moving along a surface of a sample 6 can be detected by an optical sensor system. In this context, an electromagnetic radiation source 2 (for instance a laser source) emits a primary electromagnetic radiation beam 13 (in particular a light beam) which propagates via a focusing unit 12 (which may be embodied as an array of one or more optical lenses) onto the probe 11. A secondary electromagnetic radiation beam 3 is generated by reflection of the primary electromagnetic radiation beam 13 at an upper surface of the probe 11. The secondary electromagnetic radiation beam 3 propagates to a photosensitive and position sensitive detector 10 (in particular, the secondary electromagnetic radiation beam 3 can be deflected by a deflection mirror 14 or another optical deflection element onto the detector 10. When the measuring probe 11 is moved by an actuator 4 (which can trigger a position change in the vertical direction according to FIG. 1) and/or when the measuring probe 11 changes its shape, a modification of the laser light can be detected at the position sensitive detector 10. Depending on the interaction of measurement tip 5 (which can also be denoted as cantilever tip) of the probe 11 with sample 6 under analysis or to be characterized and being arranged on a sample holder 54 or directly on a sample support 17, the response of the probe 11 will vary and a corresponding region of the detector 10 will be impinged by the secondary electromagnetic radiation beam 3. The detector signal may be processed in an evaluation unit 8. The generated high resolution image of the surface of the sample 6 can be displayed by a display unit 9. A surface of the sample 6 can be scanned by measuring tip 5 (i.e. with sensitive tip 5 of the probe 11). The sample support 17 can be moved in a horizontal plane (i.e. in an x-direction and in a y-direction perpendicular to the shown z-direction). Hence, the scanning probe microscope 1 serves for determining surface information concerning the sample 6 by scanning a surface of the sample 6 by the probe 11. In the scanning probe microscope 1, the sample 6 can thus be analyzed by moving probe 11 and sample 6 relative to one another.

As can be taken from FIG. 1, the scanning probe microscope 1 comprises a detection unit 60 comprising a side view camera 90 (such as a CCD camera or a CMOS camera) configured for detecting an image of the sample 6 in a horizontal side view. This substantially horizontal side view of the sample 6, descriptively speaking a vertical projection or shadow image of the height profile (see reference numeral 77) of the sample 6, is detected via a light beam (see electromagnetic radiation beam 66) propagating at an angle of less than 2° with regard to a horizontal axis (which is arranged perpendicular to the shown z-direction). More precisely, the detection unit 60 is configured to detect the height profile of the sample 6 as it would be seen when looking to the sample 6 substantially along the horizontal direction. In particular, it is possible to see one or more highest or most elevated positions or local maxima of the sample 6, corresponding to a worst-case scenario for an approaching probe 11 which shall be protected from colliding with the sample 6 (such collisions are most likely at the highest positions or local maxima of the sample 6). To meet constraints of the positioning of various elements of the scanning probe microscope 1 close to the sample 6 and the probe 11, the detection unit 60 is located at the end of a here double folded optical path (see mirrors 31, 33) despite of the fact that the image of the sample 6 captured by the detection unit 60 equals to an image as would be obtained when the detection unit 60 was located at an end of a fully horizontal unfolded optical path defined by the electromagnetic radiation beam 66 propagating substantially horizontally in the region of the sample 6 above gap 62 and between the mirrors 31, 33. Due to the true side view detection architecture shown in FIG. 1, the detection unit 60 is configured for being capable of detecting a vertical size of vertical protrusions of the sample 6 for samples 6 of different sizes without readjustment of the optics of the scanning probe microscope 1. For instance, samples 6 with dimensions up to 30 mm or more may be detected precisely.

Furthermore, the scanning probe microscope 1 comprises a determining unit 80 (which may be a processor, part of a processor, or multiple processors) being configured for determining information indicative of a height profile of a surface of the sample 6 based on the detected one or more images provided by the detection unit 60. More precisely, the determining unit 80 is configured for determining information indicative of a shadow image of the sample 6 based on the detected image as a result of the side view arrangement of the detection unit 60.

In one embodiment, the determining unit 80 may simply process the image data for deriving information about the height map of the sample 6 in the shown vertical or z-direction. However, in order to further refine the height profile information, one or more additional measures may be taken. For instance, a predefined light pattern (for instance one or more straight light lines) may be projected onto the sample 6, and the detection unit 60 may optically measure the fingerprint thereof. The determining unit 80 may correspondingly analyze a detected image of the sample 6 on which the predefined light pattern is projected. Descriptively speaking, a surface curvature as a result of a height profile of the sample 6 will translate into a bending of the (in particular previously straight) lines of the predefined light pattern, so that any of the cameras, e.g. the wide view camera 92 and/or the side view camera 90, may detect such manipulated lines. Additionally or alternatively, the determining unit 80 may also analyze a detected image of the sample 6 in terms of pattern recognition and object recognition to further refine characterization of the sample topography. The detection unit 60 may also be moved relative to the sample 6 (for instance by 90° in the horizontal plane), to capture multiple side view images in different orientations of the sample 6.

As can be taken from FIG. 1, the scanning probe microscope 1 further comprises a processing unit 72 configured for processing the determined information to thereby determine control information for controlling sample 6 and probe 11 to move relative to one another to an initial profile-related starting position for analysing sample 6. It is also possible that the processing unit 72 determines control information for controlling sample 6 and probe 11 to move relative to one another along a profile-adapted trajectory during analysing sample 6. In other words, the processing unit 72 may use the information indicative of the vertical height map of the sample 6 for determining a proper starting position for the analysis of the sample 6 by probe 11 and/or for determining a trajectory along which the probe 11 or the sample 6 moves at the beginning and/or during analysis of the sample 6. This determination may for instance be made under consideration of the boundary condition that collisions between probe 11 and/or structures supporting the probe 11 and protruding sections of the sample 6 are to be avoided. In other words, the analysis of the sample 6 by scanning probe 11 along the sample 6 may be carried out based on the determined sample height distribution information.

Preferably, it is possible to calibrate the side view camera 90 or sensor with respect to motorized stages of the scanning probe microscope 1 which move the sample 6 with respect to the side view camera 90 to be able to create a height map over the whole sample area. This allows for safe movement from one position on the sample 6 to another position taking into account shapes and sizes of measurement sensor/head which should not crash into the one or more samples 6.

Still referring to FIG. 1, the detection unit 60 configured for side view sensing is further configured for detecting an image of gap 62 between the sample 6 and the probe 11 in a substantially horizontal side view. This substantially horizontal side view of the gap 62 is also detected via the light beam (see electromagnetic radiation beam 66). More precisely, the detection unit 60 is, in addition to the imaging of the sample 6 in terms of height profile determination, configured to detect the image of the gap 62 between the vertically spaced (see z-direction) sample 6 and probe 11 as it would be seen when looking to the gap 62 substantially along the horizontal direction. Due to the true side view detection architecture shown in FIG. 1, the detection unit 60 is configured for being capable of detecting a vertical size of the gap 62 for samples 6 of different sizes without readjustment of the optics of the scanning probe microscope 1.

The scanning probe microscope 1 moreover comprises a drive unit 63 configured for driving or moving, in terms of a coarse adjustment and/or a subsequent fine adjustment of a spatial probe-sample relationship, the sample 6 relative to the probe 11 for mutually approaching probe 11 and sample 6 from an initial distance of for instance 10 mm to a final distance of for instance 0.2 mm based on the detected sample profile information and the image of the gap 62 and optionally additionally based on information obtained from detector 10. More specifically, the drive unit 63 is configured for moving the sample 6 with respect to the probe 11 for mutually approaching probe 11 and sample 6 from the initial distance to an intermediate distance with a first velocity in terms of the coarse adjustment for which the determined sample height profile and/or the detected image of the gap 62 may be used.

Alternatively, the drive unit 63 can also be configured for moving the probe 11 with respect to the sample 6 for mutually approaching probe 11 and sample 6 from the initial distance to an intermediate distance with a first velocity in terms of the coarse adjustment for which the determined sample height profile and/or the detected image of the gap 62 may be used.

Subsequently, probe 11 and sample 6 may be further approached from the intermediate distance to the final distance with a second velocity smaller than the first velocity, for instance based on the determined sample height profile and/or data from the detector 10. With the detected information concerning the sample height profile and/or of the precise size of the gap 62, as accurately determined based on the true side view images of sample 6 and gap 62 detected by the detection unit 60, the coarse adjustment can be carried out at the high first velocity without the risk of an undesired collision of probe 11 and sample 6. The drive unit 63 can be operated manually by a user or automatically under control of a control unit 84 (such as a processor). Control unit 84 may control operation of the scanning probe microscope 1 and may for this purpose be coupled to at least some of the elements according to reference numerals 4, 8, 60, 63, 72, 80 and 90.

Furthermore, the scanning probe microscope 1 comprises an illumination unit 64 configured for laterally and homogeneously illuminating the sample 6 and for illuminating the gap 62 with electromagnetic radiation 66, for instance a beam of visible light, from a substantially horizontal side position via the double folded optical path according to FIG. 1. Hence, the optical path between the illumination unit 64 and the detection unit 60 is a folded optical path comprising two folding positions defined by two reflection mirrors 31, 33. The detecting unit 60 and the illumination unit 64 are arranged on opposing ends of the doubled folded optical path with the sample 6 and the probe 11 spaced by the gap 62 in an intermediate position. Thus, the electromagnetic radiation 66 propagates from the illumination unit 64 via mirror 31, via the gap 62 and via mirror 35 to the detection unit 60. Advantageously, the illumination unit 64 is configured for homogeneously illuminating sample 6 and gap 62 with substantially identical intensity over the entire respective width.

Optical system 68 is arranged between the gap 62 and the detection unit 60 and is preferably configured as a telecentric optical system providing a magnification independent of a distance between the gap 62 and the detection unit 60. The telecentric optical system 68 comprises a lens 70 arranged at a distance to the detection unit 60 corresponding to a focal length of the lens 70.

The above-mentioned determining unit 80 is provided with image data indicative of the image of both sample 6 and gap 62 as detected by the detection unit 60 and is configured for also determining a quantitative value of the distance or gap size between the sample 6 and the probe 11 based on the detected image. This value may be supplied to the control unit 84 and may serve as a basis for the control of the drive unit 63 by the control unit 84. Also the determined sample height profile may be supplied to the control unit 84 for controlling operation of the scanning probe microscope 1 taking account the surface profile 77 of the sample 6. Optional processing unit 72 is also configured for processing multiple horizontally detected images generated by the detection unit 60. Alternatively or additionally, the detected image may be displayed on a screen and thus can be observed by an operator.

An optical manipulation unit 74 may be provided and configured for manipulating the electromagnetic radiation 66 propagating from the sample 6 and the gap 62 towards the detection unit 60 for generating a set of parallel rays of electromagnetic radiation 66 with homogeneous intensity.

The detection unit 60 may comprise a camera providing information used for a vertical or z-alignment. In an embodiment, this camera generates both an image of the sample surface and observes or measures the vertical distance between the probe 11 and the sample 6. Both items of information can be used for safely approaching of the cantilever-type probe 11 towards the sample 6.

In the following, operation of the scanning probe microscope 1 will be explained. Before starting to initiate an actual scanning probe microscope measurement, the mutual positioning between the sample 6 and the cantilever 7 needs to be adjusted. For that purpose, the sample 6 and the cantilever 7 are firstly placed at a sufficiently high distance of for instance 10 mm so that any damage of undesired collision or impingement between sample 6 and cantilever 7 can be avoided. Subsequently, the drive unit 63 firstly approaches sample 6 and cantilever 7 by a coarse adjustment at a relatively high first velocity until sample 6 and cantilever 7 have reached a mutual distance of for instance 1 mm. In order to obtain the information how far the sample 6 and the cantilever 7 can be approached towards each other, the height profile of the sample 6 is determined and an image of the gap 62 between the sample 6 and the cantilever 7 is detected. For this purpose, the illumination unit 64 emits an optical light beam as electromagnetic radiation beam 66. After deflection by mirror 31, the electromagnetic radiation beam 66 propagates onto the sample 6 and through the gap 62 between sample 6 and cantilever 7 and then impinges on further mirror 33. A beam adjustment can be accomplished in the beam manipulation unit 74 beforehand. After having passed lens 70, the electromagnetic radiation beam 66 reaches the detection unit 60 where the electromagnetic radiation beam 66 is detected in form of an image. Based on this detected image, information concerning the height map and the size of the gap 62 may be determined by determining unit 80. The result of this determination may be supplied, for instance via control unit 84, to drive unit 63 which can perform the coarse adjustment on the basis of the determined size of the gap 62. Due to the horizontal propagation of the electromagnetic radiation beam 66 between the mirrors 31 and 33, a shadow image of the sample 6 as well as a horizontal image of the gap 62 can be detected by the detection unit 60. However, thanks to the presence of the detection mirrors 31 and 33, it is possible to arrange the detection unit 60 as well as the illumination unit 64 spaced with regard to the sample-probe region, where only a small space can be present for accommodating such units. The illumination unit 64 can be a light emitting diode or an array of light emitting diodes. In order to improve the homogeneity of the illumination of the sample 6 and the gap 62, a diffuser 37 or the like may be arranged between the illumination unit 64 and the gap 62. Due to the true horizontal side view of the gap 62 captured by the described scanning probe microscope 1, the height profile of the sample 6 as well as the size of the gap 62 can be determined with high accuracy, and the sample-probe adjustment can be made very accurate as well.

Figure 2:
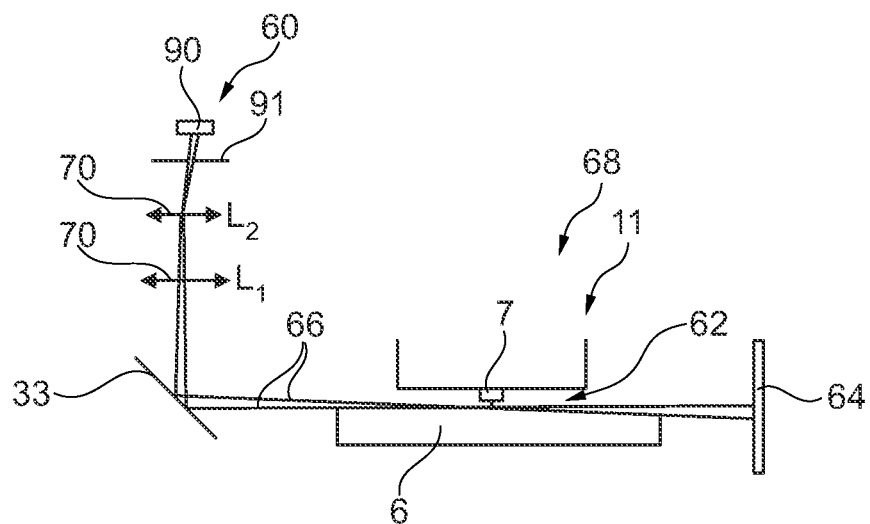
FIG. 2, FIG. 3 and FIG. 4 illustrate different cross-sectional views of optical systems of a scanning probe microscope according to exemplary embodiments of the invention.
Figure 3:
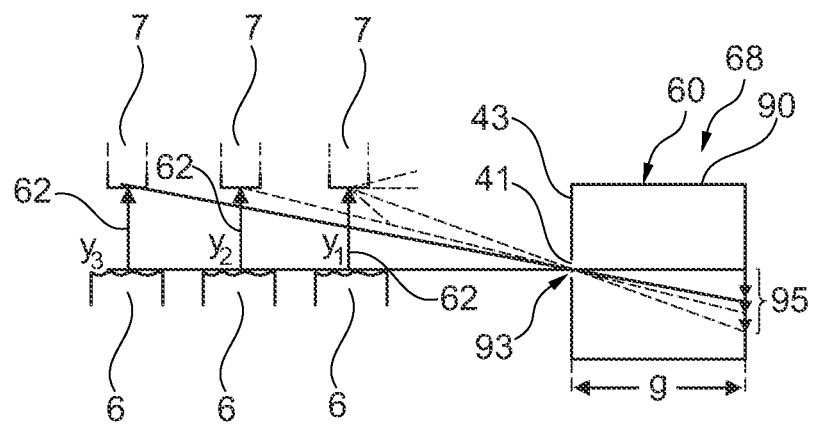
Figure 4:
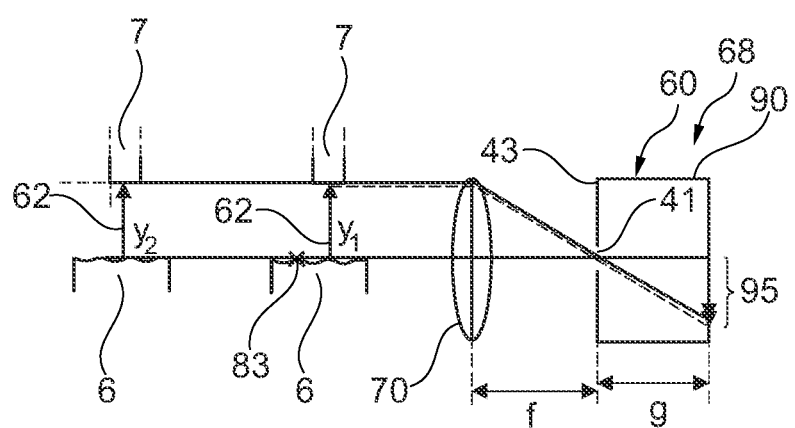

FIG. 2 to FIG. 4 illustrate different cross-sectional views of optical systems 68 of a scanning probe microscope 1 according to exemplary embodiments of the invention.

Referring to FIG. 2, an object-side telecentric side view sensor or optical system 68 is shown. In FIG. 2, an optical path between the illumination unit 64 and a light-sensitive surface of the detection unit 60 is folded as a result of the implementation of mirror 33 to meet constraints of the geometry of the scanning probe microscope 1. However, alternatively, it is also possible to have a double folded geometry as in FIG. 1 (for instance implementing two mirrors 31, 33), or a completely longitudinal optical path (in which for example no mirrors need to be implemented). Thus, according to FIG. 2, the optical path between the illumination unit 64 (providing a homogeneous illumination) and the detection unit 60 is a folded optical path comprising only one folding position.

As shown in FIG. 2, light arriving horizontally from the illumination unit 64 and passing through the gap 62 may be redirected by a mirror 33, prism or any other suitable optical element. The operator can watch an image for instance on a screen (which may also comprise a scale) and can control the approach of the probe 11 towards the surface of the sample 6 manually. The process can also be semi-automated or fully automated by including a control unit 84 or the like. The detection unit 60 measures sample surface profile information and the size of the gap 62 and, by processing this information, movement of the probe 11 and/or the sample 6 may be controlled.

The illumination unit 64 (such as a light source) generates a homogeneous illumination beam or electromagnetic radiation beam 66 arriving horizontally at the scene, i.e. propagating along gap 62 and on the sample 6 with its rough surface. The illumination unit 64 preferably homogeneously illuminates both gap 62 and sample 6 from a lateral direction. Contrary to FIG. 1, the illumination unit 64 is now arranged in alignment with the propagation direction of the electromagnetic radiation beam 66 at the position of the gap 62, and not perpendicular thereto. The light source itself is not necessarily positioned in the x-y-plane (as it is in FIG. 2), but light arriving from any direction above or below may be redirected into that plane. The electromagnetic radiation beam 66 should ensure a substantially homogeneous illumination of the gap 62 between sample 6 and probe 11. If intensity fluctuations or variations of the light remain sufficiently small (which means that the incoming light does not become excessively inhomogeneous), even transparent objects can be detected with high accuracy.

The incoming electromagnetic radiation beam 66 may arrive from any direction or any angle in the x-y-plane. In an exemplary embodiment of the invention, an appropriate position of the light source or electromagnetic radiation source 64 (or the related mirror 31, prism etc.) may be in a direction which is diametrically opposite to the camera or detection unit 60 (or the related mirror 33, prism, etc.).

In a preferred embodiment of the invention, a telecentric optical system 68 may be implemented. Such a telecentric optical system 68 may be telecentric in the object space. An advantage of such an optical configuration is that, on the image plane, an image of an object has the same size, independent of its distance (see FIG. 4). In other words, there is no perspective distortion in such a telecentric configuration. A telecentric optical system 68 according to an exemplary embodiment basically works with one lens 70. (See, for example, FIG. 1 or FIG. 4). The configuration shown in FIG. 2 comprises two lenses 70. However, the number of lenses 70 can also be different from one or two. Downstream of the lens(es) 70, an aperture 91 may be provided through which the electromagnetic radiation beam 66 propagates before it reaches detection unit 60.

FIG. 3 shows a possible optical system 68 of a scanning probe microscope 1 according to an exemplary embodiment of the invention. Three objects (see y1, y2, y3) at different distances from a pinhole camera 43 are shown, wherein these objects (see y1, y2, y3) symbolize gap 62 between cantilever 7 and sample 6. As can be taken from FIG. 3, objects having equal dimensions y1=y2=y3 but being positioned at different distances from the pinhole camera 43 will be imaged on a detection screen or detecting surface with different sizes. When the optical system 68 of FIG. 3 is implemented, care should be taken that the sample-probe arrangement is located at a predefined position to prevent that optical artefacts are involved. Reference numeral 93 denotes a projection center, and images 95 of the objects (see y1, y2, y3) are shown as well. A distance between pinhole and detecting surface is illustrated by reference character "g".

The optical system 68 shown in FIG. 4 relates to a preferred embodiment of the invention due to the implementation of a telecentric optical system 68. As the embodiment of FIG. 3, the embodiment of FIG. 4 implements an optical path between the illumination unit 64 (not shown, but illuminating both gap 62 and sample 6 homogeneously) and the detection unit 60 which is an unfolded linear optical path.

Two objects (see y1, y2) having equal dimensions y1=y2 but being located at different distances from pinhole camera 43 are shown, wherein these objects (see y1, y2) symbolize gap 62 between cantilever 7 (or probe 11) and sample 6. With this configuration of pinhole camera 43 and lens 70, the dimension of the gap 62 to be imaged on a detection screen is independent of whether the gap 62 is located at a first position (see y1) or at a second position (see y2). The profile of the sample 6 and additionally the size of the gap 62 can therefore be determined precisely regardless of an exact position of a probe-sample arrangement. Highly advantageously, a distance f between the lens 70 and the aperture 41 of the pinhole camera 43 equals to a focal length of the lens 70. Images 95 of the objects (see y1, y2) have all the same (or substantially the same) size.

The telecentric optical system 68 according to FIG. 4 provides a magnification independent of a distance between the gap 62 and the side view camera 90 of the detection unit 60. However, the telecentric optical system 68 may also provide a magnification independent of a distance between a respective measurement point 83 of interest (which is shown exemplarily in FIG. 4) of the sample 6 and the side view camera 90.

Figure 5:
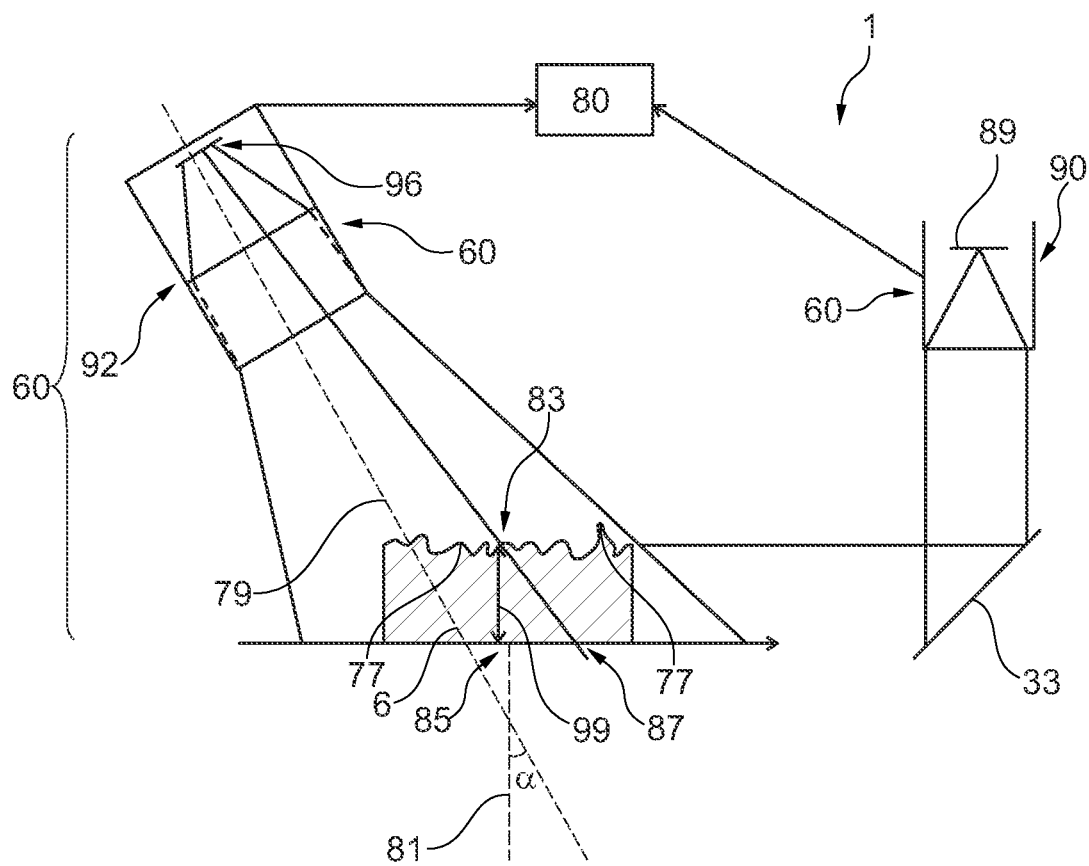
FIG. 5 shows part of a scanning probe microscope according to another exemplary embodiment of the invention providing a height map of a sample to be analyzed using a side view camera and a wide view camera.

FIG. 5 shows part of a scanning probe microscope 1 according to another exemplary embodiment of the invention providing a height map of a sample 6 to be analyzed.

As in FIG. 1, also the embodiment of FIG. 5 comprises a side view camera 90 capturing a side view image 89 of the sample 6. However, in the embodiment of FIG. 5, the detection unit 60 comprises additionally a wide view camera 92 arranged and configured for detecting a wide angle image 96 of a major or even the entire surface portion of the sample 6, and detects a corresponding image from an obliquely upward position. A tilting angle, α, between an optical axis 79 of the wide view camera 92 and a vertical axis 81 may be less than 45°, in particular may be in a range between 20° or 30°. The tilting angle, α, may also be 0°, corresponding to a top-down orientation of the wide view camera 92. The tilting angle, α, may be selected in accordance with space requirements and constraints in the framework of the scanning probe microscope 1 and should be selected so that the wide view camera 92 can see enough of the sample 6 within its range of view. Thus, the detection unit 60, being composed of the side view camera 90 and the wide view camera 92 according to FIG. 5, is configured for detecting the multiple images of the sample 6 by the multiple cameras 90, 92 arranged at different spatial positions and in different spatial orientations.

The target is to determine information of the measurement point 83, in particular its x-coordinate 85 and its local sample height 99 (i.e. the distance between the measurement point 83 and the vertical projection of the measurement point 83 on the x-axis, the x-coordinate 85). With an unknown sample height 99 at this x-coordinate 85, due to the slanted view of the wide view camera 92, the real x-coordinate 85 and the real sample height 99 cannot be determined. The sample height 99 might be between 0 (i.e. along the x-axis) and the distance between the measurement point 83 and the x-coordinate 85, and the x-coordinate 85 might be at a further point 87 or at the point corresponding to the real x-coordinate 85 or somewhere in-between. For instance when a complete three-dimensional surface profile map is desired (which may be the case in specific embodiments in which a shadow profile is not considered sufficient), only a combination of the information of both the wide view camera 92 and the side view camera 90 yields the correct data. The sample height 99 and the x-coordinate 85 can be determined exactly. By scanning the surface of the sample 6 point by point (i.e. by measuring at different measurement points 83) and applying the described method, the surface profile 77 can be determined.

The algorithm described in the previous paragraph can be applied, mutatis mutandis, also to the y-coordinate.

For instance, it is possible to measure at measurement point 83 of the sample 6 the local height 99 by detecting the measurement point 83 in a side view and from above or from a slanted position. It is possible to repeat this procedure for different measurement points 83 of the sample 6 to obtain in combination the height profile 77. The determining unit 80, being coupled with the side view camera 90 and with the wide view camera 92, is configured for determining information indicative of a three dimensional profile of the surface of the sample 6 based on the detected images. Thus, the determining unit 80 here analyses multiple detected images of the sample 6 in terms of three-dimensional reconstruction. As a result, the determining unit 80 is configured for reconstructing the surface profile 77 of the sample 6 by combining an image of the side view camera 90 indicative of a projection of the sample 6 on a vertical plane with a further image provided by the wide view camera 92 being indicative of a projection of the sample 6 on a slanted plane (in particular a plane intersecting the aforementioned vertical plane with an angle larger than 0° and smaller than 90°, for instance between 5° and 85°) or on a horizontal plane.

By adding the wide view camera 92 or sensor to the scanning probe microscope 1, it becomes possible to provide a top-down or slanted view to the user for further simplifying navigation. However, a normal camera only provides a two dimensional representation of the scene it observes which leads to a non-unique relation between a point in the camera image and the real three dimensional scene.

By correlating the image of the wide view camera 92 with the observed heights from the side view camera 90, it is possible to resolve this ambiguity which allows the user performing distinct selection of measurement points in the three-dimensional measurement scene. Without the additional information coming from the side view camera 90, navigation with a slanted view camera (such as wide view camera 92) may be affected by an offset that depends on the sample height and the viewing angle of the wide view camera 92. Even if the wide view camera 92 is mounted exactly vertical, which may be difficult due to space constraints, measurement points that are off the center may be affected by this offset. Thus, the combination of side view camera 90 and wide view camera 92 is particularly advantageous.

Figure 6:
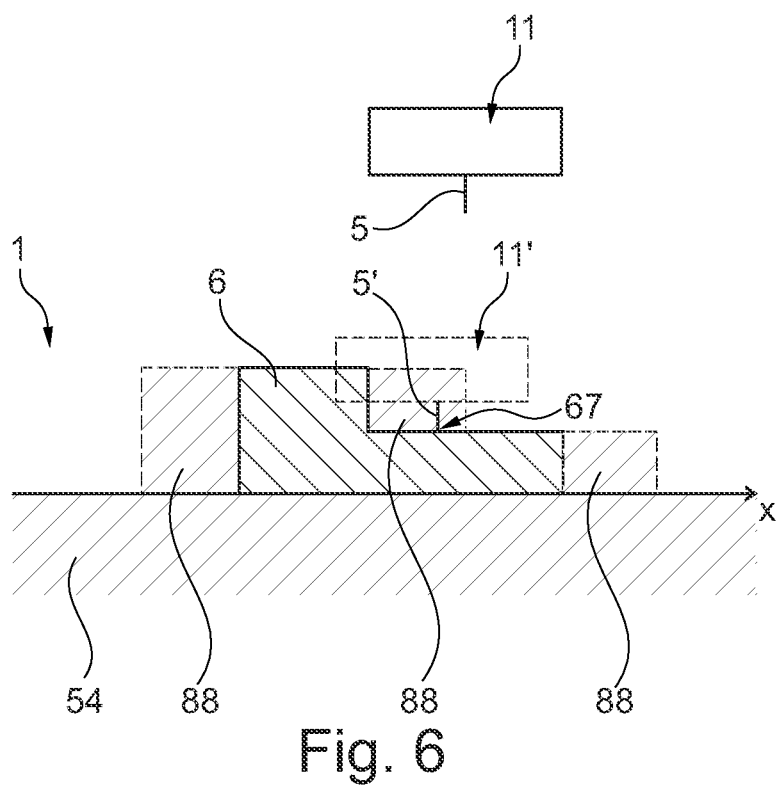
FIG. 6 shows a sample to be analyzed by a scanning probe microscope according to another exemplary embodiment of the invention, and shows regions which cannot be entered by a probe due to a surface profile of the sample.

FIG. 6 shows a sample 6 to be analyzed by a scanning probe microscope 1 according to another exemplary embodiment of the invention, and shows regions 88 which cannot be entered by a probe 11 due to a surface profile of the sample 6.

For instance, the above described processing unit 72 may be configured for processing the determined information to thereby determine the illustrated non-reachable regions 88 being geometrically not reachable by the probe 11 in view of the profile 77 of the sample 6. If the probe 11 would enter such a non-reachable region 88, a collision between probe 11 and sample 6 may occur. Such a highly undesired collision may be prevented by determining such one or more non-reachable regions 88 which can be estimated based on the knowledge of the previously determined height profile 77 of the sample 6. Reference numeral 67 indicates an exemplary measurement position that cannot be reached due to the described geometrical constraint. If the probe 11 was hypothetically moved to the position according to a reference numeral 67 (as indicated schematically by reference numeral 11'), a collision might occur. Thus, another benefit of the availability of the three dimensional scene layout as indicated by the determined profile information of the sample 6 is that the user can be directly informed about regions 88 in the scene that cannot be reached with the measurement probe 11 due to the topography of probe 11 and surface of the sample 6.

In addition, with the additional sensor available, the height map can be improved by fusing information from the side view sensor 90 with information from the wide view sensor 92. Considering an optical image sensor, this additional information could be retrieved by pattern recognition and/or object recognition methods as well as three dimensional reconstruction methods using for example, different views onto the sample 6, shape from focus, and/or structured light.

Using the simple (compare FIG. 1) or refined (compare FIG. 5) height map, navigation can now be improved by one or more of:

blocking the user from moving to forbidden regions 88 where it is not possible to reach the sample surface with the measurement sensor/head;

correcting for perspective distortions of the wide view image sensor;

moving the measurement sensor/head directly near to the sample surface to decrease time to measurement;

improving or even optimizing movement trajectories from one position/sample 6 to another position/sample 6 that has a different height, thereby improving the required safe height during transition.

Figure 7:
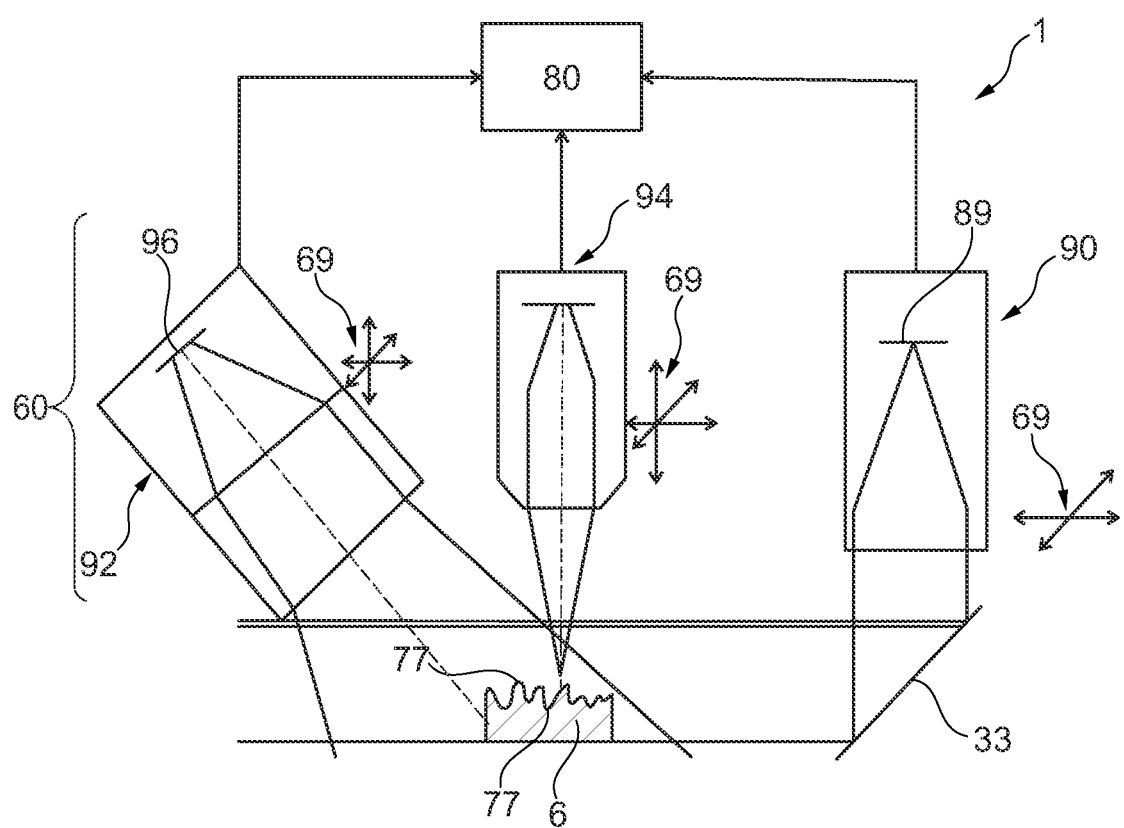
FIG. 7 shows part of a scanning probe microscope according to still another exemplary embodiment of the invention providing a height map of a sample to be analyzed using a side view camera, a wide view camera and a narrow view camera.

FIG. 7 shows part of a scanning probe microscope 1 according to still another exemplary embodiment of the invention providing a height map of a sample 6 to be analyzed.

According to FIG. 7, the detection unit 60 is configured for detecting the multiple images of the sample 6 by three different types of cameras 90, 92, 94 arranged at different spatial positions and in different spatial orientations. More specifically, in addition to the provision of side view camera 90 and wide view camera 92, the detection unit 60 according to FIG. 7 additionally comprises narrow view camera or microscope 94 arranged and configured for detecting a subportion of the sample 6 in a top-down view and with higher resolution compared to cameras 90, 92. As indicated by reference numeral 69, it is optionally also possible to configure at least one of cameras 90, 92, 94 and/or the sample 6 for being moved relative to one another to different positions.

In an embodiment as in FIG. 5, the wide view camera 92 may, for instance for high performance or high accuracy applications, capture the sample 6 with insufficient resolution so that tiny details may not be resolved by the combination of side view camera 90 and wide view camera 92 alone. When adding the microscope 94, as shown in FIG. 7, navigation is enabled also in a small spatial range with high local resolution, due to the additional information captured by the microscope 94.

As a further alternative to the separate provision of wide view camera 92 and microscope 94 as shown in FIG. 7, it is alternatively also possible to combine both their functionality in one common camera 92+94 which can for instance be switched between a wide view (or macro) mode and a narrow view (or micro) mode.

Figure 8A:
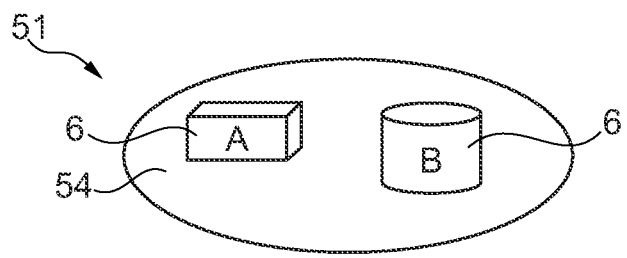
FIG. 8A shows an actual image of a sample on a sample holder.
Figure 8B:
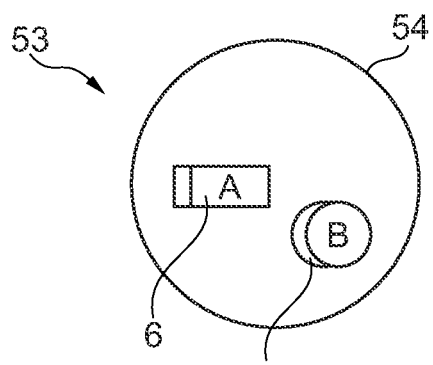
FIG. 8B and FIG. 8C show images of a sample on a sample holder captured by a wide view camera (FIG. 8B) and by a side view sensor (FIG. 8C) according to exemplary embodiment of the invention.
Figure 8C:
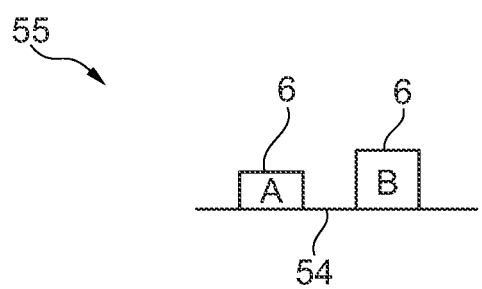
Figure 8D:
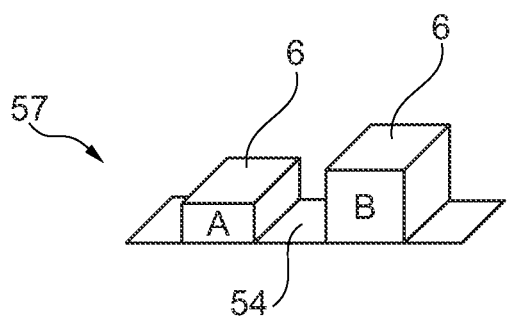
FIG. 8D shows a determined height map derived from the images of FIG. 8B and FIG. 8C according to exemplary embodiment of the invention.

FIG. 8A shows an actual image 51 of a sample 6 (comprising objects A and B) on a sample holder 54. FIG. 8B and FIG. 8C show images 53, 55 of the sample 6 on the sample holder 54 captured by a wide view camera 92 or macro image sensor (FIG. 8B) and by a side view sensor 90 (FIG. 8C) according to exemplary embodiment of the invention. FIG. 8D shows a determined height map 57 derived from the images 53, 55 of FIG. 8B and FIG. 8C according to exemplary embodiment of the invention.

Thus, FIG. 8A to FIG. 8C illustrate a workflow for determining a basic height map 57 with an instrument setup as shown for instance in FIG. 5.

The wide view image 53 shown in FIG. 8B provides plan view information about the sample 6 and its objects A and B. The side view image 55 shown in FIG. 8C provides projected information (or a shadow image) about the sample 6 and its objects A and B, thereby providing quantitative height values. The reconstruction according to FIG. 8D combines the complementary items of information according to FIG. 8B in FIG. 8C so that the three-dimensional height map 57 can be determined.

In an embodiment according to FIG. 7, in which additionally a microscope 94 is implemented, detailed information of the substructure of objects A and B may be added, so that the height map 57 according to FIG. 8D can be further refined.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures and described above. Instead, a multiplicity of variants is possible which use the solutions shown and the principle according to the invention even in the case of fundamentally different embodiments.

We claim:

1. A scanning probe microscope, in particular an atomic force microscope, for analysing a sample by moving a probe and the sample relative to one another, the scanning probe microscope comprising:
   a detection unit which comprises a side view camera arranged and configured for detecting an image of the sample in a substantially horizontal side view,
   wherein the side view camera is arranged and configured for additionally monitoring a gap between the sample and the probe in a substantially horizontal side view;
   a determining unit for determining information indicative of a profile of at least part of a surface of the sample based on the detected image,
   wherein the determining unit is configured for determining information of at least one of the group consisting of determining multiple height values from a shadow image of the sample, and determining a three dimensional surface function of at least part of the sample.

2. The scanning probe microscope according to claim 1, wherein the determining unit is configured for determining information indicative of the profile by combining, in particular by correlating, multiple images of the sample detected by the detection unit from different positions and/or orientations relative to the sample.

3. The scanning probe microscope according to claim 2, wherein the detection unit is configured for detecting the multiple images of the sample by:
   multiple cameras of the detection unit arranged at different spatial positions and/or in different spatial orientations relative to the sample; and/or
   configuring at least one camera of the detection unit and the sample for being moved relative to one another to different positions and/or different spatial orientations.

4. The scanning probe microscope according to claim 1, wherein the determining unit is configured for determining the information by at least one of the group consisting of:
   determining information indicative of the profile from a detected image of the sample on which a predefined light pattern is projected;
   determining information indicative of the profile from a detected image of the sample by carrying out at least one of pattern recognition and object recognition;
   analyzing multiple detected images of the sample in terms of a three-dimensional reconstruction of a height profile of at least part of the sample.

5. The scanning probe microscope according to claim 1, further comprising:
   a processing unit configured for processing the determined information to thereby determine at least one of:
   at least one non-reachable region of the sample being not reachable by the probe in view of the profile of the sample;
   control information for controlling the probe and the sample to move relative to one another to an initial profile-related position for subsequently analyzing the sample;
   control information for controlling the probe and the sample to move relative to one another along a profile-adapted trajectory during analyzing the sample.

6. The scanning probe microscope according to claim 1, wherein the image in the substantially horizontal side view is detected at an angle of less than 5° to a horizontal axis.

7. The scanning probe microscope according to claim 1, further comprising:
   an optical system arranged at least partially between the sample and the detection unit.

8. The scanning probe microscope according to claim 7, comprising at least one of the following features:
   wherein the optical system is a telecentric optical system, in particular a telecentric optical system providing a magnification independent of a distance between a measurement point of interest of the sample and the side view camera;
   wherein the optical system is a telecentric optical system, in particular a telecentric optical system providing a magnification independent of a distance between a gap between the sample and the probe on the one hand and the side view camera on the other hand.

9. The scanning probe microscope according to claim 1, further comprising:
   an illumination unit configured for illuminating at least one of a side projection of the sample, and a gap between the sample and the probe with electromagnetic radiation from a substantially horizontal side position.

10. The scanning probe microscope according to claim 1, wherein the detection unit comprises a wide view camera arranged and configured for detecting a wide view image of at least part of the sample from a top position or from an oblique position.

11. The scanning probe microscope according to claim 1, wherein the detection unit comprises a microscope arranged and configured for detecting a subportion of the sample from a top position or from an oblique position.

12. The scanning probe microscope according to claim 1, wherein the determining unit is configured for reconstructing the profile of the sample by combining at least one image captured by the side view camera and corresponding to a projection of the sample on a vertical plane with at least one further image captured by at least one further camera and corresponding to a projection of the sample on another plane.

13. A method of analyzing a sample by a scanning probe microscope, in particular an atomic force microscope, the method comprising:
   detecting an image of the sample using a side view camera in a substantially horizontal side view, wherein the side view camera is arranged and configured for additionally monitoring a gap between the sample and the probe in the substantially horizontal side view;
   determining information indicative of a profile of at least part of a surface of the sample based on the detected image, hereby determining information of at least one of the group consisting of determining multiple height values from a shadow image of the sample, and determining a three dimensional surface function of at least part of the sample;

analyzing the sample by moving the probe and the sample relative to one another taking into account the determined information.

* * * * *